United States Patent [19]

Fukuda

[11] Patent Number: 5,059,275

[45] Date of Patent: Oct. 22, 1991

[54] PAPER FEED PREPARATORY DEVICE

[75] Inventor: Akira Fukuda, Shiginonishi, Japan

[73] Assignee: Hamada Printing Press Co., Ltd., Osaka, Japan

[21] Appl. No.: 479,528

[22] Filed: Feb. 13, 1990

[30] Foreign Application Priority Data

Feb. 13, 1989 [JP] Japan .................................... 1-33378

[51] Int. Cl.[5] ............................................... B32B 31/18

[52] U.S. Cl. ..................................... 156/511; 156/516; 156/517; 156/519; 156/521; 156/522; 156/552

[58] Field of Search ............... 156/505, 517, 519, 521, 156/511, 516, 522, 556, 560, 552

[56] References Cited

U.S. PATENT DOCUMENTS

| | | | |
|---|---|---|---|
| 4,046,615 | 9/1977 | Jansen | 156/560 |
| 4,083,737 | 4/1978 | Foote | 156/556 |
| 4,636,279 | 1/1987 | Morgan | 156/517 |
| 4,812,198 | 3/1989 | Fuke et al. | 156/505 |

*Primary Examiner*—Caleb Weston
*Attorney, Agent, or Firm*—Wenderoth, Lind & Ponack

[57] ABSTRACT

A paper feed preparatory is provided for connecting the end of a web of paper drawn out from a paper roll mounted in a paper supply unit to a plate-shaped leader adapted to be moved from the paper supply unit along one side of a paper feed path. It includes a suction conveyor for attracting and feeding the web of paper in one direction, and a paper cutter adapted to move transversely of the web of paper while the paper is being fed longitudinally to cut it obliquely. A tape applicator is provided over the belt conveyor so as to be movable toward and away from the top of the suction conveyor. It has a tape reel carrying a roll of adhesive tape and a presser member for sticking the end of the adhesive tape to the end of the paper along one side thereof with the leader sandwiched therebetween to connect them together.

1 Claim, 3 Drawing Sheets

PAPER FEED PREPARATORY DEVICE

BACKGROUND OF THE INVENTION

The present invention relates to a paper feed preparatory device for connecting the end of a roll of paper set in a paper supply unit of a paper processing machine such as a rotary press to a leader adapted to move along a paper feed path in the paper processing machine.

A rotary press has in general a leader mounted at one side of a paper feed path so as to be movable therealong. Before a printing operation is preformed, the end of the paper roll set in the paper supply unit is connected to the leader, which is then moved to insert the paper into the paper feed path.

Such paper feed preparation includes peeling off defective superficial portions of the roll paper, sticking a reinforcing adhesive tape on the outer periphery of the paper roll along one side thereof, cutting the end of the paper of the paper roll obliquely, and finally connecting the end of the paper to the leader.

Such preparation of the feeding paper has heretofore been done manually and thus required a great deal of time and trouble.

SUMMARY OF THE INVENTION

It is an object of the present invention to provide a paper feed preparatory device which obviates the above said shortcomings and which makes it possible both to mechanically treat the end of the paper of the paper roll set in the paper supply unit and to mechanically connect the end of the paper to the leader.

In accordance with the present invention, there is provided a paper feed preparatory device for connecting the end of a web of paper drawn out from a paper roll mounted in a paper supply unit to a plate-shaped leader adapted to be moved from the paper supply unit along one side of a paper feed path. The device comprises a suction box provided at the entrance to the paper feed path to attract with a suction force the end of the web of paper from the bottom thereof, a suction conveyor provided downstream of the suction box with respect to the feed direction of the paper so as to attract the paper end with a suction force larger than that produced in the suction box and carry the paper in the feed direction, and a cutter assembly provided between the suction conveyor and the suction box and having a paper cutter adapted to move transversely of the web of paper while the paper is being fed, thereby cutting the web of paper obliquely. In addition, a tape applicator is provided over the suction conveyor so as to be movable toward and away from the top of the suction conveyor, and a means is provided upstream of the tape applicator for inserting the leader between the tape application and the paper web. The tape applicator has a tape reel for carrying an adhesive tape, and a presser member for pressing the end of the adhesive tape pulled thereunder against the top surface of the paper along one side thereof with the leader sandwiched between the adhesive tape and the paper when the tape applicator is moved toward the top of the suction conveyor. Further a tape cutter is secured to the front side with respect to the feed direction of the paper to in order to contact and cut the adhesive tape when the tape applicator is raised.

The paper roll set in the paper supply unit is unwound so that the end of the paper is pulled out over the suction box and onto the suction conveyor. The latter is actuated to move the paper whereas the cutter on the cutter assembly is moved from one side of the paper where the tape applicator is provided to the other side thereof to cut the paper obliquely.

When the cutter begins to move, the leader is moved to a position above the suction conveyor. When the leader is moved to a position directly under the tape applicator, the latter is lowered to press the end of the adhesive tape against both the paper and the leader so as to straddle them. As the paper is fed further down stream, the adhesive tape is drawn from the tape reel and stuck on the top surface of the paper along one side thereof. When a predetermined length of the tape is stuck on the paper, the tape applicator is raised to cut the adhesive tape by means of the cutter.

BRIEF DESCRIPTION OF THE DRAWINGS

Other features and objects of the present invention will become apparent from the following description taken with reference to the accompanying drawings, in which.

DETAILED DESCRIPTION OF THE INVENTION

Figure 1:
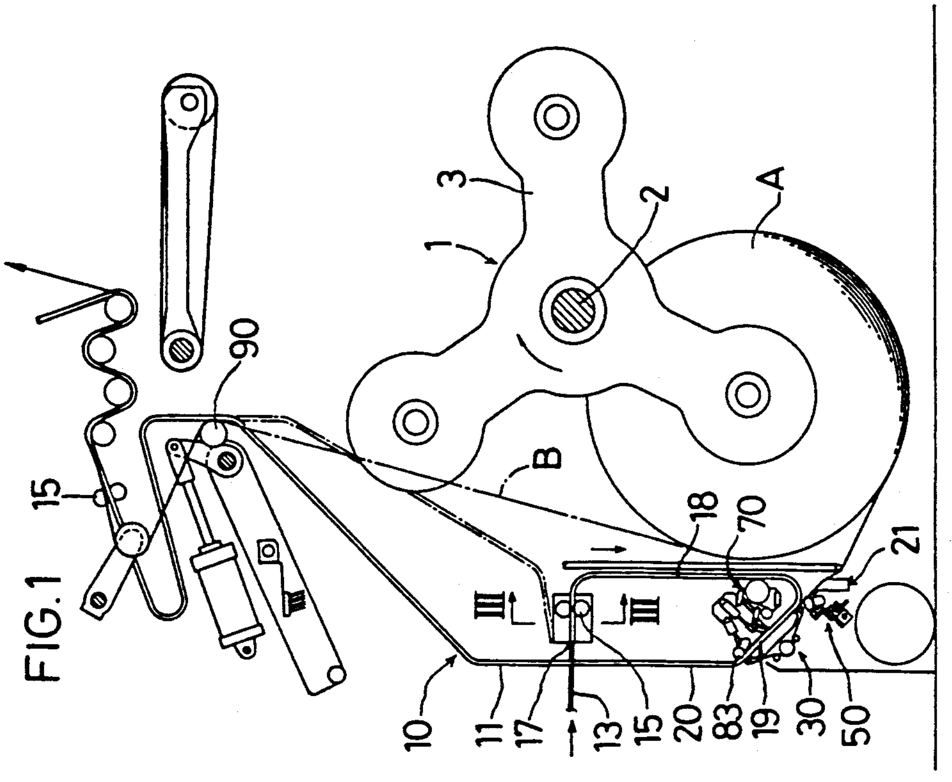
FIG. 1 is a front view of an embodiment of the present invention.

In the example shown in FIG. 1, a paper feed preparatory device is mounted in a paper supply unit 1 in a rotary press. In the unit 1, there is provided a rotary shaft 2 having trifurcated arms 3. A roll of paper A is supported on one of the arms 3.

The end of the paper of the paper roll A is inserted into a paper feed path with the paper roll A positioned directly under the rotary shaft 2. A paper feed unit 10 is provided at one side of the paper feed path to move a leader adapted to be connected to the end of the paper along the paper feed path.

The paper feed unit 10 may be a belt adapted to move along the paper feed path with the leader connected thereto. In the preferred embodiment, it comprises a tubular guide rail 11 provided at one side of the paper feed path and formed with a guide slit 12 in one side thereof and a flexible linear member 13 received in the guide rail 11 so as to be movable therethrough.

The guide rail 11 is also formed with a plurality of pairs of diametrically opposed roller insert holes 14. A feed roller 15 is received in each hole 14 so as to partially protrude into the guide rail 11. As shown in FIG. 1, the roller insert holes 14 and thus the feed rollers 15 should be provided so that the distance between adjacent pairs will be substantially equal to the length of the linear member 13 in order to feed it by rotating the feed rollers 15.

Figure 6:
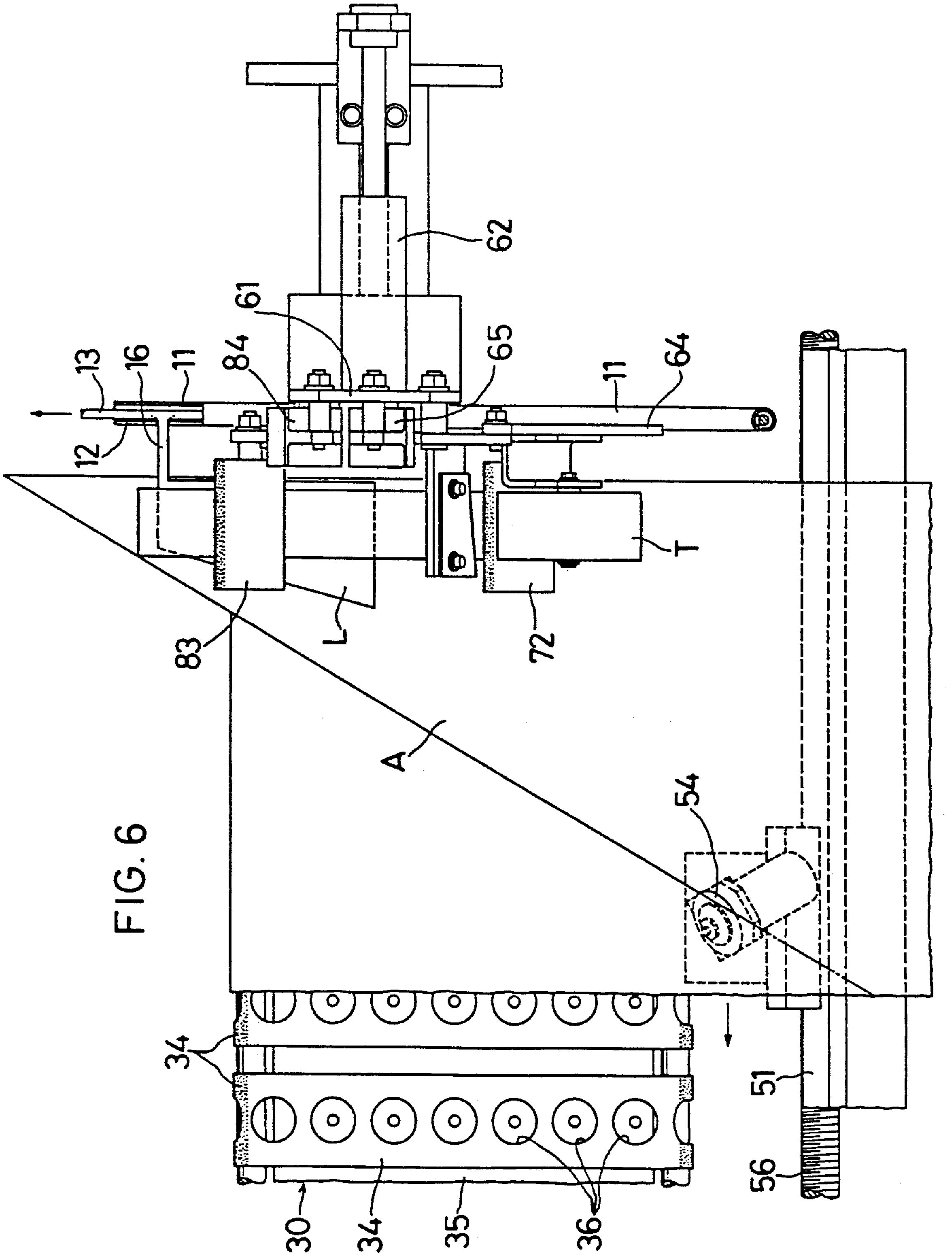
FIG. 6 is a sectional view taken along line VI—VI of FIG. 5.

As shown in FIG. 6, the linear member 13 has an arm 16 secured to one side thereof so as to protrude outwardly through the guide slit 12 in the guide rail 11. A leader L in the shape of a plate is secured to the protruding end of the arm 16. The guide rail 11 has one end thereof located near one side of the rotary shaft 2. The linear member 13 is inserted into the guide rail 11 through an opening 17 at this end. Then it is fed downwardly through an upright portion 18 of the guide rail 11 obliquely upwardly through its inclined portion 19 upwardly obliquely and then through its upright portion 20.

The end of the paper of the paper roll A mounted in the paper supply unit 1 is pulled obliquely upwardly so that the web of paper unrolled from the roll A will extend substantially parallel to the inclined portion 19 of the guide rail 11. Under the web of paper thus pulled out, there are provided a suction box 21 and a suction conveyor 30 located downstream of the suction box 21 with respect to the feed direction of the paper.

Figure 2:
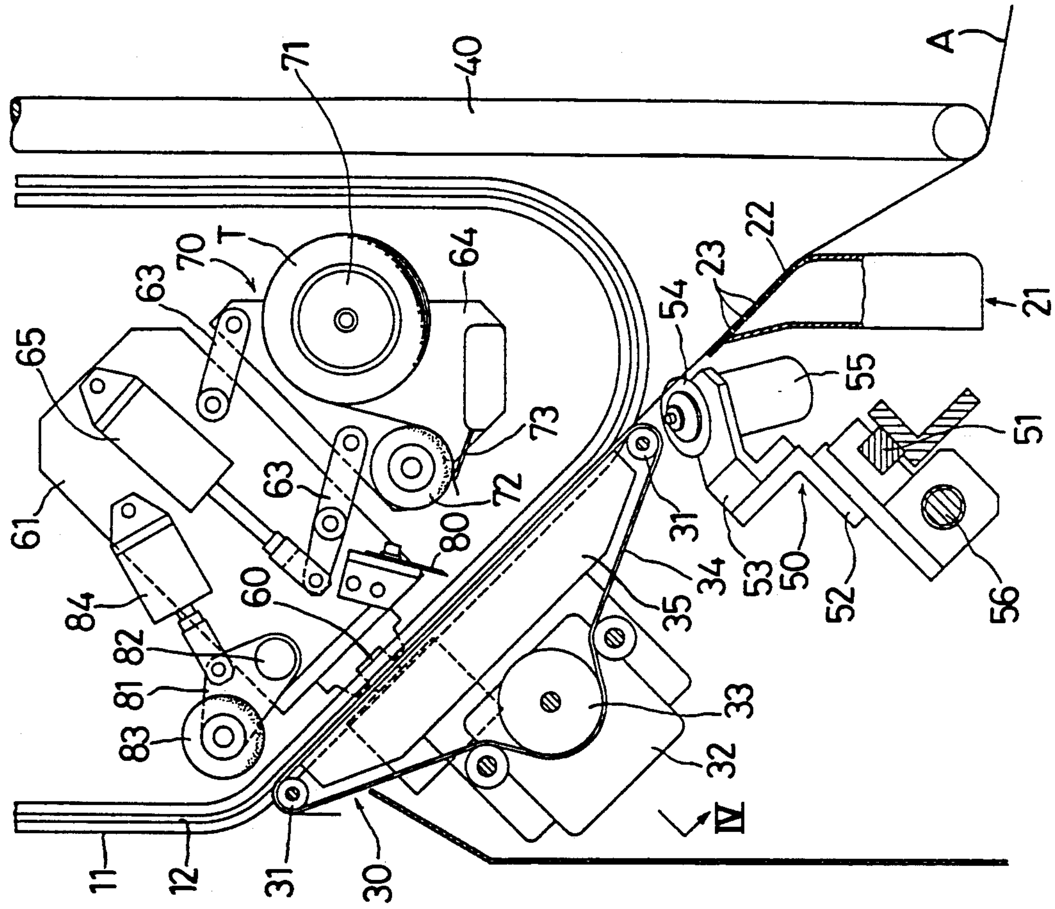
FIG. 2 is an enlarged partially cutaway front view of a portion of the embodiment of FIG. 1.

As shown in FIG. 2, the suction box 21 has an inclined top plate 22 for guiding the, the top plate 22 being paper A formed with a large number of suction holes 23. A suction force generated in the suction box 21 is applied through the suction holes 23 to the paper A being fed along the inclined plate 22 to attract it to the plate 22.

As shown in FIG. 2, the suction conveyor 30 comprises a roller 33 driven by a motor 32, a plurality of perforated belts 34 trained about the driven roller 33 and disposed in a row (see FIG. 4), and a suction box 35 provided inside the belts 34 and having a top plate formed with suction holes (not shown) in opposing relation to the belts 34. A suction force generated in the suction box 35 is applied through the suction holes to the perforations 36 in the belts 34. The suction force applied to the perforations 36 should be larger than the suction force applied to the suction holes 23 in the suction box 21.

A presser bar 40 is provided between the suction box 21 and the paper roll A. It is adapted to move downwardly after the paper has been drawn onto the suction box 21 to press the paper down.

A cutter assembly 50 is provided between the suction box 21 and the suction conveyor 30 to cut the web of paper transversely. As shown in FIG. 2, it comprises a rail 51 extending transversely of the web of paper A, a cutter carriage 52 slidably mounted on the rail 51, a bracket 53 fixedly mounted on the carriage 52, a cutter 54 and a motor 55 for driving the cutter 54 mounted on the bracket 3, and a threaded shaft 56 extending in parallel with the rail 51 and held in threaded engagement with the cutter carriage 52 to move it along the rail 51.

Figure 4:
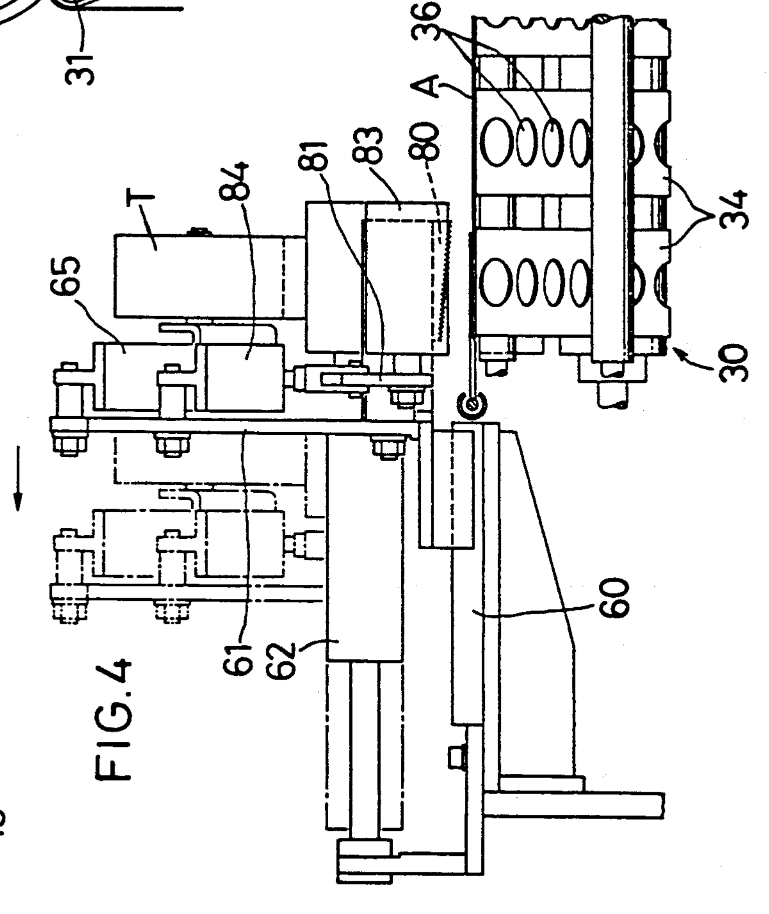
FIG. 4 is a sectional view taken along the line IV—IV of FIG. 2.

As shown in FIG. 4, a rail 60 extending transversely of the feed direction of the paper A is provided at one side of the suction conveyor 30. A roller carriage 61 is provided so as to be slidable along the rail 60 by means of a cylinder 62.

As shown in FIG. 2, a pair of arms 63 extending parallel to each other have one end thereof pivotally connected to one side of the roller carriage 61 and the other end thereof pivotally connected to an elevator member 64. A cylinder 65 is coupled to one of the arms 63 to raise and lower the elevator member 64. A tape applicator 70 is mounted on the elevator member 64 to apply a reinforcing adhesive tape T to the top of the paper A being fed onto the suction conveyor along the side thereof nearer to the leader L.

The tape applicator 70 comprises a reel 71 for supporting a roll of adhesive tape T, a presser member 72 in the form of a roller for pressing the end of the adhesive tape drawn out from the reel 71 against the top surface of the paper A on the suction conveyor when the elevator member 64 is lowered, and a leaf spring 73 secured to the elevator member 64 to resiliently press the end of the adhesive tape T which has been pulled under the presser member 72 against its outer periphery.

A cutter 80 is provided under the roller carriage 61 so as to come into contact with and cut the adhesive tape T stuck on the paper A when the elevator member 64 is raised.

A roller arm 81 is provided ahead of the cutter 80 with respect to the feed direction of the paper A, with its one end pivotally mounted on the lower part of the roller carriage 61 through a pin 82. A press roller 83 is rotatably mounted on the other end of the roller arm 81. A cylinder 84 is connected to the intermediate portion of the roller arm 81 to move the press roller 83 vertically. When the press roller 83 is lowered, it is adapted to press against the adhesive tape T stuck on the top surface of the paper A along one side thereof.

In operation, the end of the paper of the paper roll A set in the paper supply unit 1 is pulled out by hand over the suction box 21 and onto the suction conveyor 30. The linear member 13 having the leader L is inserted into the guide rail 11 through its opening 17 and fed therethrough by rotating the feed rollers 15 until the leader L reaches a predetermined position. Then a starter switch is turned on.

When the starter switch is turned on with the end of the paper A placed on the suction conveyor 30, a vacuum is produced in the suction boxes 21 and 35, so that a suction force is applied to the suction holes 23 in the suction box 21 and to the perforations 36 in the belt 34 through the suction holes in the suction box 35 to attract the end of the paper A.

At the same time, the presser bar 40 moves downwards as shown in FIG. 2 to press down the trailing end of the web of paper A.

When the downward stroke of the presser bar 40 stops, the suction conveyor 30 is actuated to feed the paper A in one direction whereas the roller carriage 61 begins to move along the rail 60 until the presser member 72 of the tape applicator 70 and the press roller 83 come to such a position as to oppose one side of the paper A on the suction conveyor 30.

As the paper A begins to move, the cutter 54 on the cutter assembly 50 is moved from one side of the paper A to the other side. By the longitudinal movement of the paper A and the transverse movement of cutter 54, the paper is cut obliquely. As soon as the cutter 54 begins to cut the paper, the leader L begins to move.

Figure 5:
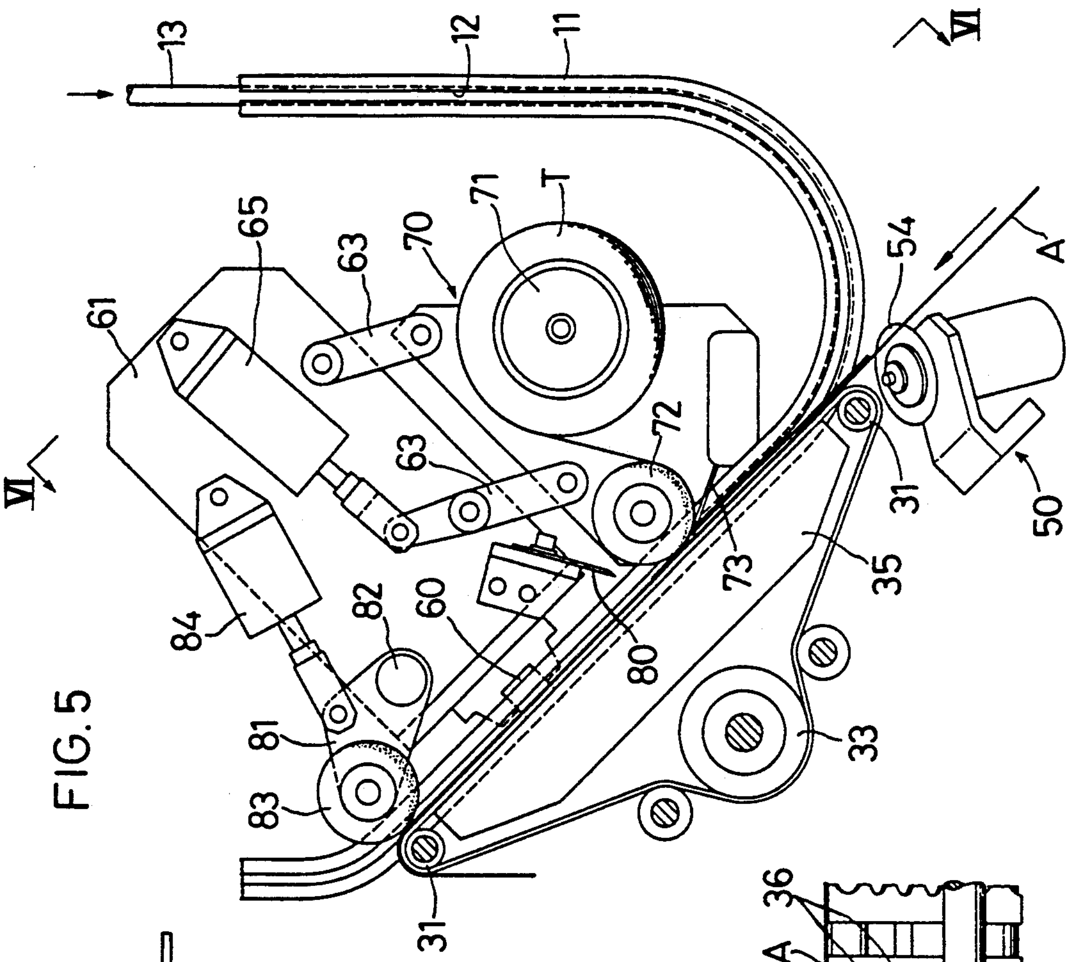
FIG. 5 is a front view similar to FIG. 2 showing how the invention operates.
Figure 3:
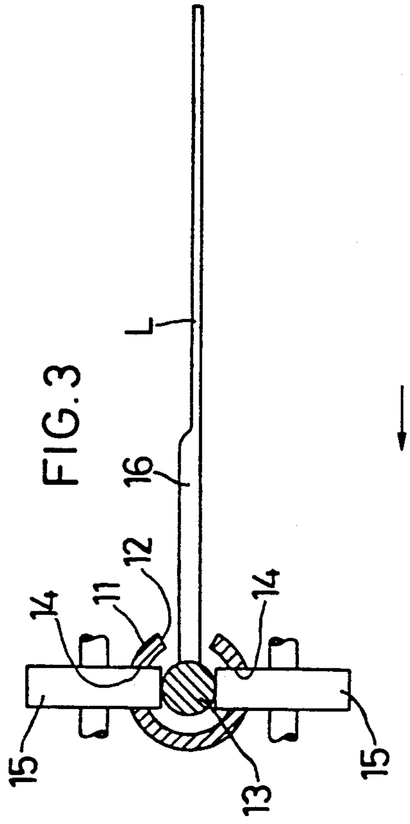
FIG. 3 is a sectional view taken along line III—III of FIG. 1.

The end of the paper A thus cut obliquely, and the leader L, proceed in juxtaposition to each other. As shown in FIG. 5, when they are positioned directly under the press member 72 of the tape applicator 70, the elevator member 64 is lowered to press the end of the adhesive tape T pulled out under the presser member 72 against both the leader L and the paper A in such a manner as to straddle them.

The adhesive tape T having its end stuck on the top surface of the paper A is unwound and stuck on the paper along one side thereof as the paper is fed further ahead. When the adhesive tape T thus stuck on the paper passes under the press roller 83 lowered beforehand, it is pressed by the press roller 83 against the paper A and bonded fast thereto.

When the cutter 54 finishes cutting the paper A, the elevator member 64 is raised to pull the adhesive tape T up and cut it by contact with the cutter 80. When the rear end of the adhesive tape T thus cut passes under the press roller 83, the latter rises. At the same time, the roller carriage 61 moves away from the side of the paper A along the rail 60.

Also, the presser bar 40 is raised to remove the tension of the paper A, a suction force imparted to the suction conveyor 30 and the suction box 35 is removed and the end of the paper A connected to the leader L is fed to a predetermined position and stopped.

When a command to feed the paper is given in this state, the leader L is moved through the paper feed path to feed the paper A through the paper feed path.

The presser bar 40 is capable of getting out of the paper feed path. When the presser bar 40 and the roller carriage 61 get out of the paper feed path, the paper A is adapted to extend from the paper roll to a guide roller 90 in the upper part of the paper supply unit 1 in a straight line as shown by chain line B in FIG. 1. Then the paper roll A mounted on the lowermost one of the arms 3 is rotated about the rotary shaft 2 in the direction of arrow to a predetermined position. The linear member 13 stops when the end of the paper connected to the leader L reaches an entrance to the printing unit.

What is claimed is:

1. A paper feed preparatory device of connecting the end of a web of paper drawn out from a paper roll mounted in a paper supply to a plate-shaped leader adapted to be moved from said paper supply unit along one side of a paper feed path, said device comprising a suction box provided at the entrance to said paper feed path to attract with a suction force the end of the web of paper from the bottom thereof, a suction conveyor provided downstream of said suction box with respect to the feed direction of the paper so as to attract the paper end with a suction force larger than that produced in said suction box and carry the paper in said feed direction, a cutting assembly provided between said suction conveyor and said suction box and having a paper cutter adapted to move transversely of the web of paper while the paper is being fed, thereby cutting the web of paper obliquely, a tape applicator provided over said suction conveyor so as to be movable toward and away from the top of said suction conveyor, means provided upstream of said tape applicator for inserting the leader between said tape applicator and the web of paper, said tape applicator having a tape reel for carrying an adhesive tape and a presser member for pressing the end of the adhesive tape pulled thereunder against the top surface of the paper along one side thereof with the leader sandwiched between the adhesive tape and the paper when said taper applicator is moved toward the top of said suction conveyor, and a tape cutter secured to the front side with respect to the feed direction of the paper to come into contact with and cut the adhesive tape when said tape applicator is raised.

* * * * *